United States Patent Office 3,562,354
Patented Feb. 9, 1971

3,562,354
POLYVINYL CHLORIDE BASED COATINGS CONTAINING GLYCIDYL METHACRYLATE AND VINYL ACETATE FOR METALLIC OBJECTS
Jean Golstein, Brussels, Belgium, assignor to Solvay & Cie, Brussels, Belgium
No Drawing. Filed May 1, 1968, Ser. No. 725,913
Claims priority, application Belgium, May 3, 1967, 43,181
Int. Cl. C08g 45/04
U.S. Cl. 260—836
11 Claims

ABSTRACT OF THE DISCLOSURE

A resinous coating composition which is designed for use in the coating of metallic objects by the technique of fluid bed coating or electrostatic coating comprising a polyvinyl chloride based resin which is obtained by the polymerization of a glycidylic ester of an unsaturated acid and of vinyl acetate in the presence of porous grains of polyvinyl chloride.

BACKGROUND OF THE INVENTION

The present invention is directed to resinous coating compositions which are designed for use on metallic objects. The resinous compounds of the instant invention have a base of polyvinyl chloride and are well suited for the coating of metallic objects and other similar surfaces by means of fluid bed coating techniques and electrostatic charge coating techniques, and particularly, techniques employing electrostatic fluid bed and electrostatic spraying means.

In recent years, many new techniques for coating metallic objects and surfaces have been developed. These include fluid bed, electrostatic fluidized bed, and electrostatic spraying techniques, all of which present several advantages with respect to coating metal over previously used techniques. All of the newer techniques are simple and rapid and require relatively small investments when compared to the methods previously employed. In addition, the new techniques described above also make it possible to obtain an extremely thin and uniform coating upon the desired surface without the use of solvents.

The coating of metallic objects and surfaces with plastic materials is a rapidly developing field. Among the many resinous coatings which have been employed, it is well known that polyvinyl chloride possesses unquestionable advantages over other resins, such as polyamides and polyolefins. Polyvinyl chloride is resistant to chemical and atmospheric conditions and provides the coated surface with a smooth and bright appearance at a relatively low cost. In the past, resins having a polyvinyl chloride base have been applied by previously known coating techniques which began with a powder of the polyvinyl chloride base resin. These resinous coatings were not satisfactory, however, as in general they did not adhere with the desired degree of tenacity to the metal surface. Various ways have been proposed to overcome this disadvantage. These have included for example preliminary application of a primer or the projection of the dry powder in the presence of humid vapor atmospheres. These atmospheres were intended to facilitate the agglomeration of the powder on the objects. While these attempts to perfect the coating of metals with polyvinyl chloride based resins have resulted in an improved end product, they are still considered unsatisfactory.

In addition to the above proposed techniques United States Pat. Nos. 3,100,578 and 3,170,963, and Belgian Pat. No. 615,473 disclose the preparation of thermohardening coatings which possess good adherence properties. The above patents disclose a process in which a metallic object is coated with a coating or varnish which has a base of grafted vinylic polymers which are obtained by the grafting of compounds containing an epoxyde group, such as glycidyl acrylate and methacrylate on a copolymer of vinyl chloride. While the process and compositions disclosed result in an improved product, the coatings and varnishes cannot be utilized in fluid bed coating, electrostatic fluidized bed coating or electrostatic spraying techniques as said coatings and varnishes can only be applied if they are in suspension in a liquid. Furthermore, the generic polymer base employed in the above compositions is generally a copolymer of vinyl chloride with vinylidene chloride or vinyl acetate because polyvinyl chloride is not soluble in the majority of organic solvents normally employed in the coating techniques.

In addition, if one polymerizes glycidyl acrylate or methacrylate on a suspension of polyvinyl chloride, one does not obtain a resin able to gel. Moreover, the product of the polymerization of vinyl chloride with glycidyl acrylate or methacrylate cannot be employed in the more recent coating techniques because of poor thermal stability and high fusion temperature.

In addition to the above copolymers, compositions have been prepared by the grafting of glycidyl acrylate or methacrylate on copolymers of vinyl chloride with vinyl acetate. These compositions have been found to be unsuitable as the vinyl chloride-vinyl acetate copolymers lack porosity and the resultant graft polymer lacks thermal stability and good homogenization characteristics because of the inefficient polymerization.

OBJECTS OF THE INVENTION

It is an object of the instant invention to provide a composition which is suitable for application in the coating of metal surfaces.

Another object of the instant invention is to provide a polyvinyl chloride based composition which is suitable for coating metallic objects.

Another object of the instant invention is to provide a polyvinyl chloride based resinous composition which is suitable for coating metallic objects by fluid coating or electrostatic coating techniques.

A still further object of the instant invention is to provide a resinous coating composition which has a polyvinyl chloride base and which is obtained by polymerization of polyvinyl acetate and glycidyl acrylate or methacrylate on polyvinyl chloride in the form of porous grains.

These and other objects of the instant invention will be apparent from the following and more detailed explanation thereof.

DESCRIPTION OF THE INVENTION

The instant invention concerns resinous coating compositions comprising a polyvinyl chloride base polymer which is obtained by the polymerization, in the presence of polyvinyl chloride in the form of porous grains, of from about 0.1 to 7% by weight of a glycidylic ester of an unsaturated acid selected from the group consisting of glycidyl acrylate and glycidyl methacrylate and of from about 0.1 to 15% by weight of vinyl acetate. The above composition results not only in the attainment of a thin, shiny and uniform coating, but moreover, in one which has increased adherence and thermal stability.

The polyvinyl chloride employed in the instant invention should be in the form of porous grains. This is accomplished by forming the polymerization in an aqueous suspension or in a mass in the presence of a catalyst which is soluble in the monomer. In addition, a dispersing agent may be used which tends to increase the porosity of the polyvinyl chloride. The useful catalysts include, but are not limited to, peroxydicarbonates and organic peroxides. In particular, the useful peroxides include lauroyl peroxide, 2,4 dichlorobenzoyl peroxide and acetylcyclohexanesulfonyl peroxide.

The useful dispersing agents include, but are not limited to, copolymers of vinylpyrrolidone with an alkyl acrylate of the type having an alkyl group consisting of at least 6 carbon atoms, mixtures of polyvinylic alcohol and one or more of the products which result from the condensation of a polyoxyalkylene glycol on a polyamine, partially esterified styrene-maleic anhydride copolymers, and polyvinylic alcohols having a low hydrolysis rate.

The degree of porosity of the grains of polyvinyl chloride polymer is expressed in relation to the quantity of plasticizer absorbed by 100 grams of such polymer. This quantity of plasticizer absorbed is understood to mean the quantity of plasticizer which does not separate from the polymer when a mixture of said plasticizer and polymer is subjected to mechanical treatment. The degree of porosity may be measured by adding a large quantity of plasticizer, said quantity being on the order of two times the weight of the resin employed, to said resin and forming a homogenous mixture. The homogenous mixture is then dried for 5 minutes in a centrifugal dryer whose centrifugal movement is characterized by an acceleration equal to 100 g. This drying technique eliminates the non-absorbed plasticizer. The mixture of resin and plasticizer is then weighed in order to determine the quantity of plasticizer absorbed.

The polyvinyl chloride in the form of porous grains which is employed in the instant invention must possess a capacity to absorb at least 15 grams and preferably 25 grams of plasticizer for each 100 grams of polymer.

The polymerization of glycidyl acrylate or methacrylate and vinyl acetate in the presence of polyvinyl chloride in the form of porous grains is carried out at temperatures of between 50 and 100° C. in the presence of known radical-forming catalyst, such as lauroyl and 2,4-dichlorobenzoyl peroxides and the peroxydicarbonates. The proportions of glycidyl acrylate or methacrylate and of vinyl acetate employed in the polymerization process are critical for obtaining compositions which have the desired properties, such as excellent adherence to metal and good thermal stability. Between about 0.1 and 7% by weight of glycidyl acrylate or methacrylate is employed and between 0.1 and 15% by weight of vinyl acetate is employed.

The above polymerization process of glycidyl acrylate or methacrylate and vinyl acetate in the presence of polyvinyl chloride is not essentially a grafting reaction. In effect, most of the new polymer chains are not chemically linked to those of the polyvinyl chloride. The purpose of the polymerization operation is to assure a perfect dispersion of said glycidyl acrylate or methacrylate and vinyl acetate in the polyvinyl chloride. This permits one to readily obtain a completely homogenous composition.

The resins obtained according to the instant invention are in the form of porous grains, gel easily, possess excellent adherence properties to metal as well as good thermal stability and are particularly suited for use with all coating techniques which begin with a powder as the starting material. In particular, these techniques involve those in which a fluid bed, an electrostatic fluid bed, and electrostatic spraying means are employed.

The resinous compositions of the invention are particularly suited for the covering of grill work, fences, metallic pipes, conduits, sheet metal strips and hoops, automobile parts, such as roofs and steel sheets, corrugated metallic sheets used in construction as well as for the decorative covering of grill work, etc. The objects thus covered have bright and uniform surfaces and possess unique resistance to corrosion. The resinous compositions of the instant invention may be mixed with conventional additives, such as plasticizers, stabilizers and pigments, and may be prepared by any suitable means known in the art, such as in a mixer of the Henschel-type.

Suitable plasticizers include butyldecyl phthalate, butyloctyl phthalate, dicyclohexyl phthalate, diisodecyl phthalate, octadecyl phthalate, tridecyl phosphate, octadiphenyl phosphate as disclosed in Stabilization of PVC, Chevassus, Fernand et al. (1963), Edward Arnold Ltd., pages 223–238 and Modern Plastics Encyclopedia, 1966, in an article entitled "Plasticizers" by Bechtold et al., pages 394–397. The useful stabilizers include organo tins, such as:

dibutyl tin mercaptides
dibutyl tin mercapto esters
dibutyl tin maleates
dibutyl tin laurates
dioctyl tin mercaptides
dioctyl tin mercapto esters
dioctyl tin maleates
dioctyl tin laurates
tin carboxylates
bariumcadmium carboxylates
bariumcadmium complexes
calcium carboxylates
zinc carboxylates
calcium zinc carboxylates
epoxies, phosphates and nitrogen containing compounds as disclosed in Stabilization of PVC, supra, at pages 101–168 and in Modern Plastics Encyclopedia in an article entitled "Stabilizers," Mack, Gerry P., pages 405–408.

In addition, the useful pigments include inorganic compounds, such as:

titanium dioxide
ferrous oxide
chromium oxide
ceramic cobalt
manganese compounds
phthalocyanine, quinacridone as disclosed in Stabilization of PVC, supra, pages 212–253, and Modern Plastics Encyclopedia in an article entitled "Pigments," Felsher, Hal-Curtis et al., pages 398–401.

ILLUSTRATIVE EXAMPLES OF THE INVENTION

Example I

The resin composition was prepared by the addition of 250 grams of distilled water, 0.3 gram of polyvinylic alcohol having a low hydrolysis rate, and 0.2 gram of lauroyl peroxide to an autoclave. A vacuum was created in the interior of the autoclave so as to eliminate a major portion of the oxygen therein. Subsequent to creating the vacuum, 100 grams of vinylchloride were added and the temperature of the autoclave was raised to 60° C. while maintaining the reactive mixture under constant agitation.

When the polymerization terminated, the unreacted vinyl chloride was degassed and polyvinyl chloride which had a capacity to absorb 25 grams of plasticizer to 100 grams of polymer resulted.

To 94 parts of the polyvinyl chloride polymer 5 parts of glycidyl acrylate and 1 part vinyl acetate were added in addition to 0.4 gram of lauroyl peroxide, which acted as the catalyst. The temperature was then raised to 73° C. and the polymerization carried out until a conversion efficiency of around 90% was obtained. The resulting polymerized mixture was then washed and dried. The resulting product in the form of fine and porous powder was then introduced into a Henschel-type mixer. Conventional additives such as plasticizers and stabilizers, could then be added. The mixture was then heated to 80° C. while under violent agitation. The resultant dry mixture was then cooled and a free flowing powder obtained. The above composition was employed in the following coating tests.

(A) Fluid bed.—A steel plate which had been preliminarily degreased was preheated for 5 minutes in a furnace which was maintained at a temperature of 325° C. The plate was then soaked in the fluid bed, and reheated in the furnace for 20 to 30 seconds at 325° C. After cooling, the metal was observed to be coated in a smooth manner with an adherent coating. As may be readily observed from Table I, polyvinyl chloride alone does not adhere to the metal when applied in this manner.

(B) Electrostatic fluid bed.—The resinous composition obtained by the above technique was placed in an electrostatic fluidization apparatus. One such apparatus which may be employed is the "Stafluid"-type which is produced by the Sames Company of Grenoble, France. The apparatus is adjusted so that the flow of air and voltage are regulated to obtain a maximum fluidization. A metallic plate which was connected to the ground was placed for two or three seconds in the fluidization apparatus. It was then heated in a furnace to 325° C. The resultant coating was both smooth and uniform in its distribution on said metallic plate.

(C) Electrostatic spraying.—The composition prepared by the above technique was introduced into the supply reservoir of an electrostatic spray gun. One such apparatus which may be employed for coating metallic objects is the "Stajet" apparatus produced by the Sames Company of Grenoble, France. The resinous composition was then sprayed through the spray gun onto a metallic grating which had been previously grounded. The resulting electrostatic adherence to the grating was excellent and presented an excellent surface finish. In addition to the above coating experiment, measurements were made of the adherence and thermal stability of the resin composition obtained by the above method. The adherence tests were carried out on a device which measured the traction force necessary to detach the coating at a constant traction speed of 180 mm. per minute. A device which may be employed in this type of test is the Amsler machine.

The method employed in the measuring of thermal stability involved the preparation of a homogeneous mixture of the resin with the aid of a mixer of the type employing cylinders. The product of the mixing step was cut into rectangular pieces which were immersed in a bath of oil heated at 180° C. A test piece was withdrawn from the heated oil every 5 minutes, and the evolution of color change was followed until it was noted that a complete decomposition had occurred. A complete decomposition was indicated by a brown coloration. The thermal stability is expressed by the period of time during which the test pieces can withstand the temperature mentioned above before a complete decomposition occurs. The composition of this example had an adherence of 18 kg./cm.$^2$ and a thermal stability at 180° C. of 65–90 minutes.

Example II

Polyvinyl chloride was prepared according to the method of Example I. The polyvinyl chloride was then applied to metallic surfaces according to techniques A, B, and C of Example I. The resultant coating failed to adhere and had a thermal stability of 45–60 minutes at 180° C.

Example III

Polyvinyl chloride was prepared according to the method of Example I. To 95 parts of polyvinyl chloride thus prepared, 5 grams of glycidyl acrylate and 0.4 gram of lauroyl peroxide were added. The mixture was treated as in Example I and resulted in a resin unable to gel.

Example IV

Polyvinyl chloride was prepared according to the method of Example I. To 94 parts of polyvinyl chloride thus prepared, 3 grams of glycidyl acrylate, 3 grams of vinyl acetate and 0.4 gram of lauroyl peroxide were added. The composition of this example had an adherence of 15 kg./cm.$^2$.

Example V

Polyvinyl chloride was prepared according to the method of Example I. To 94 parts of polyvinyl chloride thus prepared, 3 grams of glycidyl methacrylate, 3 grams of vinyl acetate and 0.4 gram of lauroyl peroxide were added. The composition of this example had an adherence of 16 kg./cm.$^2$.

Example VI

Polyvinyl chloride was prepared according to the method of Example I. To 94 parts of polyvinyl chloride thus prepared, 5 grams of glycidyl methacrylate, 1 gram of vinyl acetate and 0.4 gram of lauroyl peroxide, were added. The composition of this example had an adherence of 17 kg./cm.$^2$ and a thermal stability of 60–85 minutes at 180° C.

Example VII

Polyvinyl chloride was prepared according to the method of Example I. To 92 parts of polyvinyl chloride thus prepared, 5 grams of glycidyl acrylate, 3 grams of vinyl acetate and 0.4 gram of lauroyl peroxide were added. The composition of this example had an adherence of 23 kg./cm.$^2$ and a thermal stability of 79–95 minutes at 180° C.

Example VIII

Polyvinyl chloride was prepared according to the method of Example I. To 90 parts of polyvinyl chloride thus prepared, 5 grams of glycidyl acrylate, 5 grams of vinyl acetate and 0.4 gram of lauroyl peroxide, were added. The composition of this example had an adherence of 22 kg./cm.$^2$.

Example IX

Polyvinyl chloride was prepared according to the method of Example I. To 98 parts of polyvinyl chloride thus prepared, 1 gram of glycidyl acrylate, 1 gram of vinyl acetate and 0.4 gram of lauroyl peroxide were added. The composition of this example had an adherence of 10 kg./cm.$^2$.

While various preferred embodiments of the present invention have been illustrated by way of specific example, it is to be understood that the present invention is in no way to be deemed as limited thereto, but should be construed as broadly as all or any equivalents thereof.

As may be seen from the summary of the results of the above examples in Table I below, the compositions of the instant invention resulted in coatings which have excellent adherence and thermal stability properties.

TABLE I

| Composition, parts[1] | | | | Properties of the resins | |
|---|---|---|---|---|---|
| PVC | AG | MAG | AV | Adherence, kg./cm.$^2$ | Thermal stability at 180° C., minutes |
| 100 | | | | ([2]) | 45–60 |
| 95 | 5 | | | ([3]) | |
| 98 | 1 | | 1 | 10 | |
| 94 | 3 | | 3 | 15 | |
| 94 | | 3 | 3 | 16 | |
| 94 | 5 | | 1 | 18 | 65–90 |
| 94 | | 5 | 1 | 17 | 60–85 |
| 92 | 5 | | 3 | 23 | 70–95 |
| 90 | 5 | | 5 | 22 | |

[1] PVC=Polyvinyl Chloride; AG=Glycidyl Acrylate; MAG=Glycidyl Methacrylate; AV=Vinyl Acetate.
[2] Nil.
[3] Resin unable to gel.

I claim:
1. A process for producing a composition in powder form for coating metallic objects and surfaces by fluid bed coating or electrostatic coating techniques which comprises, (a) polymerizing vinyl chloride in aqueous suspension with the aid of a radical-forming catalyst so as to obtain a suspension of porous grains of polyvinyl chloride which have a capacity for absorbing at least 15 grams of plasticizer per 100 grams of polymer, (b) degassing unreacted vinyl chloride, (c) adding to the resulting polyvinyl chloride from 0.1 to 7 percent by weight of a glycidylic ester of an unsaturated acid selected from the group consisting of glycidyl acrylate and glycidyl methacrylate and from 0.1 to 15 percent by weight of vinyl acetate and (d) subsequently polymerizing the glycidylic ester and vinyl acetate on the polyvinyl chloride in the presence of a radical-forming catalyst, the percentages being based on the total weight of the polyvinyl chloride, the glycidylic ester and the vinyl acetate.

2. Powder which consists essentially of porous grains of a resinous polymeric composition which adheres well to metals, gels easily and has good thermal stability, polymer of the polymeric composition being polymer of I from 0.1 to 7 percent by weight of a member selected from the group consisting of glycidyl acrylate and glycidyl methacrylate and II from 0.1 to 15 percent by weight of vinyl acetate in admixture with III porous grains of polyvinyl chloride, the percentages being based on the total weight of I, II and III and the porous grains having capacity to absorb at least 15 grams of plasticizer per 100 grams of polyvinyl chloride.

3. Powder according to claim 2 wherein I consists of from 1 to 5 percent by weight of the member.

4. Powder according to claim 3 wherein the member is glycidyl acrylate.

5. Powder according to claim 3 wherein the member is glycidyl methacrylate.

6. Metal coated with a coating according to claim 11.

7. Powder according to claim 2 wherein II consists of at least 1 percent by weight of the member.

8. A film having the polymeric composition of powder according to claim 2.

9. Polymer of I from 0.1 to 7 percent by weight of a member selected from the group consisting of glycidyl acrylate and glycidyl methacrylate and II from 0.1 to 15 percent by weight of vinyl acetate in admixture with III porous grains of polyvinyl chloride, the percentages being based on the total weight of I, II and III and the porous grains having capacity to absorb at least 15 grams of plasticizer per 100 grams of polyvinyl chloride.

10. A resinous coating composition based on polymer according to claim 9 and in the form of free flowing powder.

11. A resinous coating, the resin of which consists essentially of polymer according to claim 9.

References Cited

UNITED STATES PATENTS

| | | | |
|---|---|---|---|
| 3,100,758 | 8/1963 | Ravve | 260—836 |
| 3,170,963 | 2/1965 | Ravve | 260—836 |
| 3,291,857 | 12/1966 | Howerton | 260—836 |

PAUL LIEBERMAN, Primary Examiner

U.S. Cl. X.R.

260—30.6, 31.8, 41, 45.75, 45.85, 884